United States Patent Office 3,085,358
Patented Apr. 16, 1963

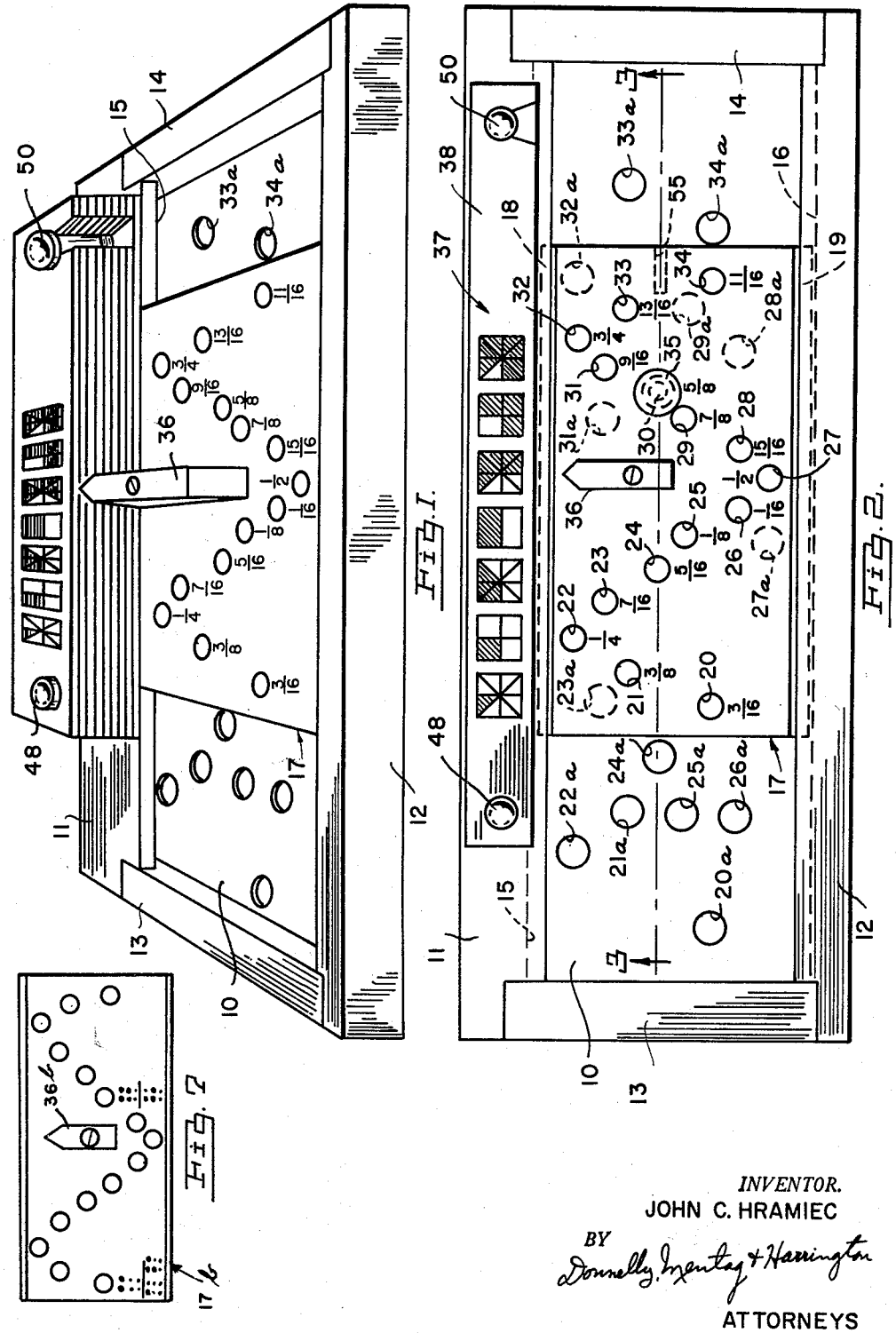

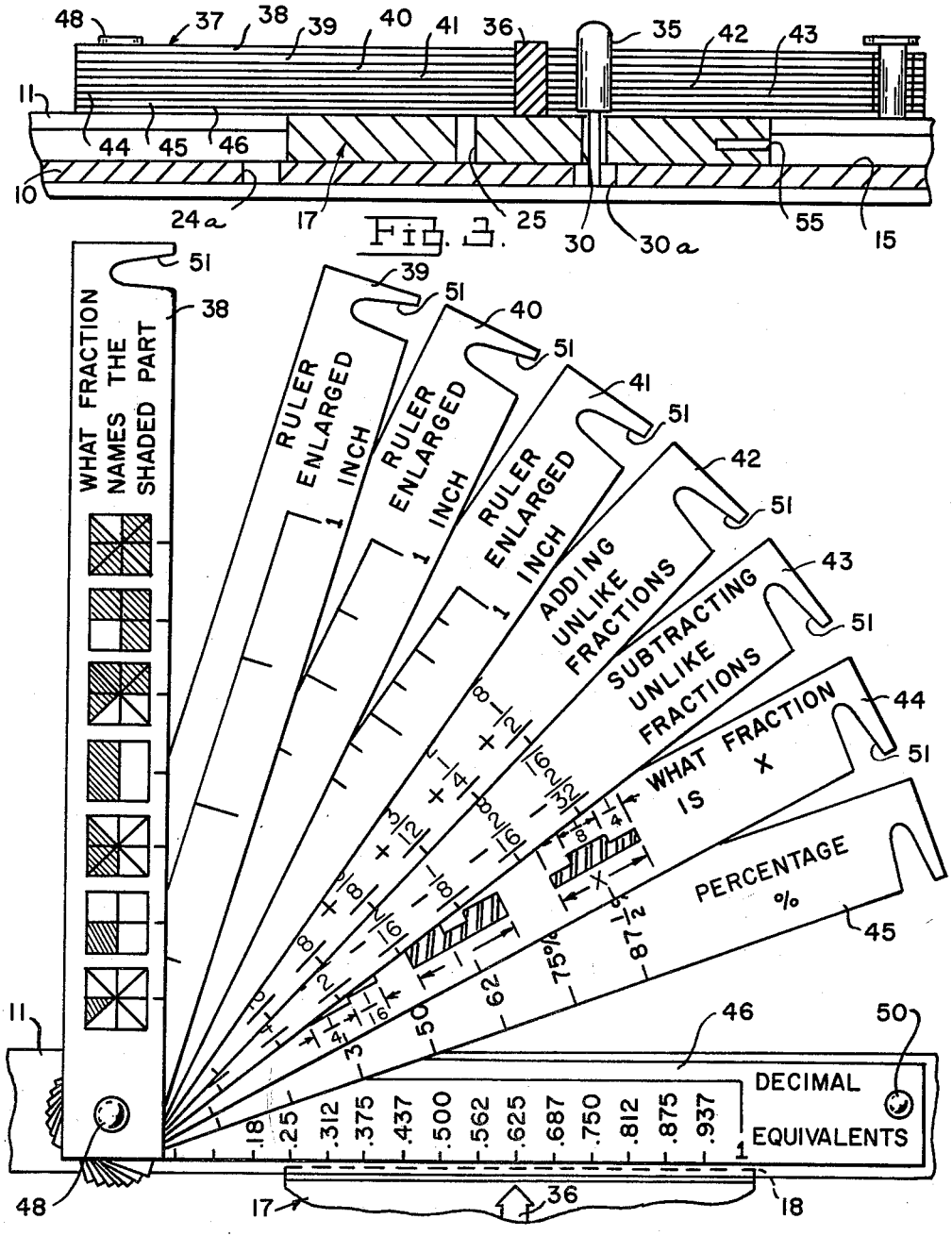

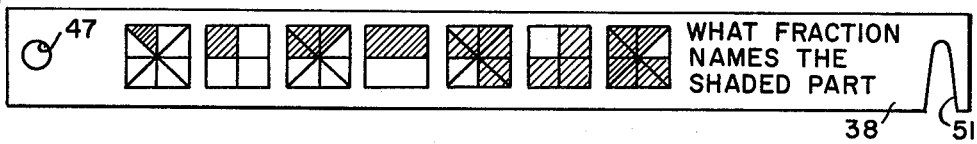
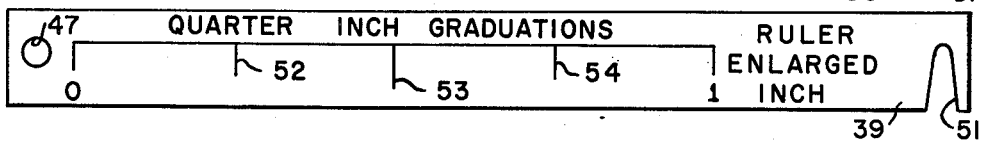
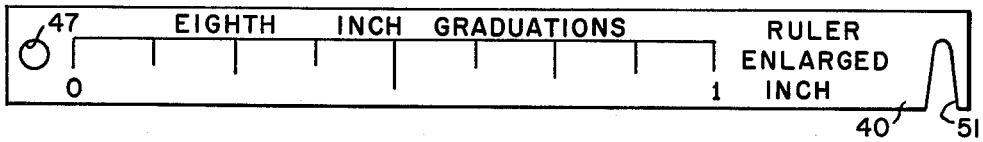
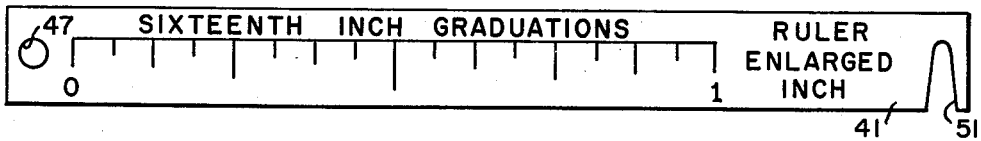
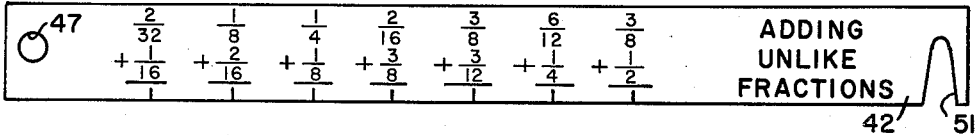
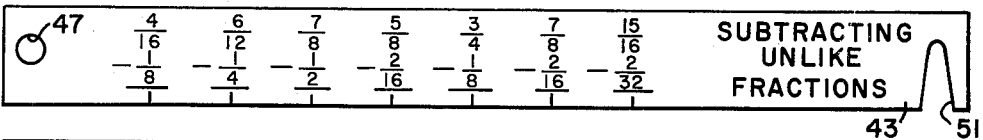
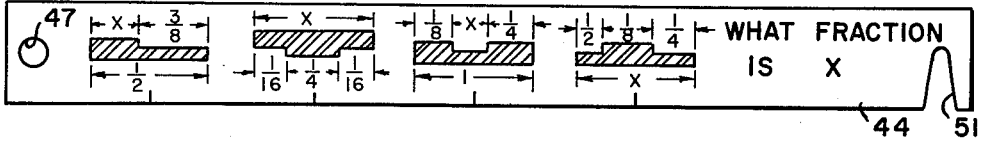
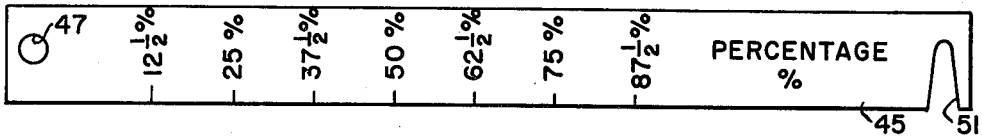
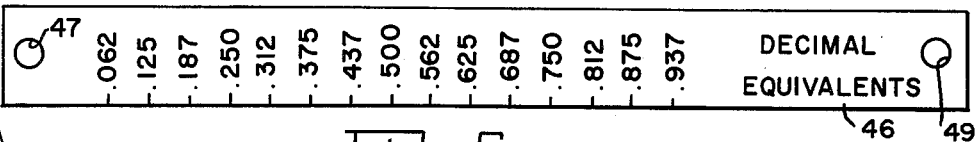
Fig. 5.
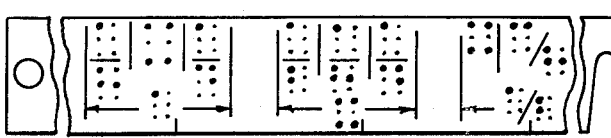
Fig. 6.

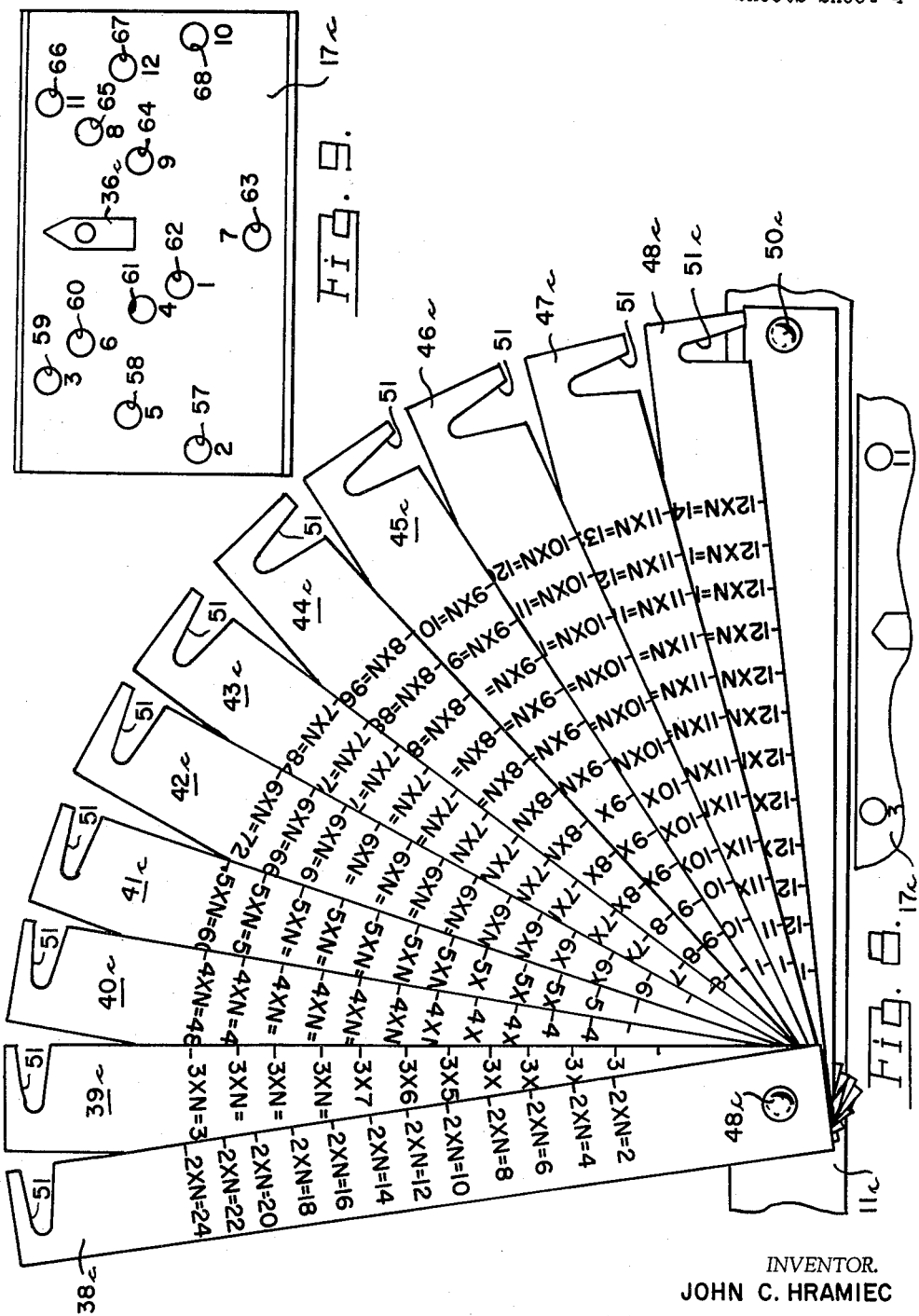

3,085,358
EDUCATIONAL AID FOR TEACHING THE RULER AND OTHER SUBJECT MATTER
John C. Hramiec, 35666 Jefferson, Mount Clemens, Mich.
Filed May 24, 1961, Ser. No. 112,286
3 Claims. (Cl. 35—31)

This invention relates to the educational art, and, more particularly, to a novel educational aid which may be used by a student as an aid for understanding the ruler, the fractional theory of arithmetic, the multiplication tables, and the like.

It is the primary object of the present invention to provide a manipulative and visual aid for learning the ruler, the fractional theory of arithmetic, and the multiplication tables, and which comprises a plurality of rulers with each ruler containing simple fractional problems, enlarged portions of a ruler, or multiplication problems and wherein a pupil learns to solve such problems, or learns the various divisions of a ruler, by moving a slide member to positions opposite to predetermined points on the aforementioned rulers and then placing a peg into a proper or correct hole in the slide to determine the correct answer. The slide is provided with a plurality of holes that are adapted to be aligned with holes in a bottom plate on which the slide is mounted, and wherein certain of the holes in the slide are adapted to be aligned with the holes in the bottom plate when the slide is positioned in predetermined positions relative to the problems on the rulers.

It is another object of the present invention to provide an educational aid wherein a student learns fractional arithmetic, multiplication, and the graduations of a ruler by associating fractional problems, multiplication problems, or graduations on a ruler, with holes aligned by means of a peg, and wherein the aligned holes must be selected from a plurality of holes in a movable slide and a plurality of holes in a stationary bottom plate. The correct answer to such problems, or the correct fractional part of an inch graduation on a ruler, is determined by placing the peg so as to align a pair of holes in the slide and bottom plate to get the correct answer, whereby the student learns by association and becomes proficient in using the ruler, has a better understanding of simple fractional problems, and learns multiplication.

It is still another object of the present invention to provide an educational aid which is simple and compact in construction, economical to manufacture, efficient in operation, and which may be used to not only teach a student knowledge of multiplication and fractional problems, or the use of a ruler, but which may be used to test a student's knowledge of the same.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a front perspective view of an educational aid made in accordance with the principles of the invention;

FIG. 2 is a top plan view of the structure illustrated in FIG. 1;

FIG. 3 is a fragmentary elevational sectional view of the structure illustrated in FIG. 2, taken along the line 3—3 thereof and looking in the direction of the arrows;

FIG. 4 is a plan view of a set of rulers employed in the invention and showing the same in a spread formation;

FIG. 5 illustrates a detached set of rulers employed in the invention and showing the various problems on the rulers which may be solved by a student;

FIG. 6 is a broken plan view of another type ruler employed in the invention and provided with braille indicia whereby the educational aid may be used for instructing a blind pupil;

FIG. 7 is a plan view of a reduced size slide employed in the invention and provided with braille indicia for use in instructing a blind student;

FIG. 8 is a plan view of a set of rulers employed in the invention, showing the same in a spread formation and provided with multiplication problems; and FIG. 9 is a plan view of a reduced size slide employed in the invention for use with the set of rulers shown in FIG. 8.

Referring now to the drawings, and in particular to FIGS. 1, 2 and 3, the numeral 10 indicates a bottom plate, or base plate, which is flat and substantially rectangular in shape. The base plate 10 is provided with the top border strip or rail 11 which is made from any suitable material, as plastic or wood, and which is fixed to the plate 10 by any suitable means. The numeral 12 indicates the bottom border strip or rail which is formed similarly to the top rail 11 and which is fastened to the plate 10 by any suitable means. As shown in FIG. 2, the educational aid further includes the left side border rail 13 and the right side border rail 14 which are fixed to the plate 10 by any suitable means. It will be seen that the border rails 11, 12, 13 and 14 extend upwardly above the plate 10, and it will be understood that they may be made from any suitable material, as wood, a light metal, a plastic material, or the like.

As best seen in FIG. 2, the top rail 11 is provided with a recess 15 along the lower inner edge thereof. The bottom rail 12 is provided with a similar recess 16 along the inner edge thereof. The recesses 15 and 16 form grooves or tracks in which slidably mounted is the movable slide, generally indicated by the numeral 17. The slide 17 is substantially rectangular in shape and is adapted to be slidably mounted on the upper face of the bottom plate 10, and it may be made from any suitable material, as wood, a lightweight metal, a plastic material, or the like. As shown in FIG. 2, the slide 17 is provided with the reduced flanges 18 and 19 along the upper and lower edges thereof and these flanges are adapted to be slidably received in the grooves 15 and 16, respectively.

As shown in FIGS. 1 and 2, the slide 17 is provided with a plurality of holes therethrough, as 20 through 34, which are adapted to be aligned with the holes 20a through 34a, respectively, when the slide 17 is disposed in certain predetermined positions, relative to the bottom plate 10, as more fully explained hereinafter.

As shown in FIGS. 2 and 3, the peg 35 is adapted to be inserted through a pair of aligned holes in the slide 17 and the bottom plate 10 as, for example, the holes 30 and 30a. The slide 17 is provided with a handle or pointer 36 which may be used by the student to align the slide 17 with certain predetermined positions relative to the set of rulers, generally indicated by the numeral 37, and which are mounted on the top border strip 11.

As shown in FIG. 5, the set of rulers 37 comprise a plurality of similarly shaped rulers indicated by the numerals 38 through 46. The left end of each of the rulers is provided with a hole as indicated by the numeral 47, and the rulers are swingably mounted in a stack on the top border strip 11, by means of the pin 48, which is adapted to pass through the holes 47 and be fixedly secured to the strip 11 by any suitable means, as by being threaded in place. The lowermost ruler 46 sets directly on the top border strip 11, and the right end thereof is provided with the hole 49 through which is received a second pin 50 that is fixedly secured to the top border strip 11 by any suitable means, as by being threaded in place. As shown in FIG. 5, the rulers 38 through 45 are provided with an elongated recess on the lower side thereof, adjacent the right end thereof, which is indicated by the numerals 51, and which is adapted to receive the pin 50 when the rulers are in the stacked position shown in FIG. 1.

It will be seen that any one of the rulers may be used to teach the student either problems in the use of the ruler as, for example, the rulers 39, 40 and 41, or the rulers 38 and 42 through 46 may be used to teach fractional problems. In the use of the educational aid of the present invention the rulers are swung outwardly as shown in FIG. 4 until the desired ruler appears. The student then moves the slide 17 until the handle 36 is aligned with the point thereof in alignment with the graduation of the ruler or problem which is to be learned. The student then puts the peg 35 into the hole which he believes to be the correct answer. If the peg 35 drops completely through the slide 17 and into a hole in the bottom plate 10, the student has selected the proper answer. If the peg 35 does not pass through the slide 17 and into a hole in the bottom plate 10, the student has selected the wrong answer. For example, in FIG. 2 the slide 17 is aligned with the marking or indicia on the top ruler 38 which indicates the fraction ⅝. In order to learn the correct answer the student must put the peg into the proper hole, and as shown in FIG. 2, the peg 35 has been inserted in the hole 30. As shown in FIG. 3, by placing the peg 35 in the hole 30 and having it pass downwardly into the hole 30a the student knows that he has selected the proper answer which is the fraction ⅝. If it is desired to teach the student the use of the ruler, then the rulers 39, 40 and 41 would be used. The ruler 39 shows an enlarged inch on which the quarter inch graduations are indicated by the lines 52, 53 and 54. It will be seen, that by moving the slide 17 so as to position the indicator 36 in alignment with the marker 52, the correct answer may be determined by putting the peg 35 into the hole 22, which will be aligned with the hole 22a in the bottom plate 10, to give the right answer or part of an inch. The ruler 40 teaches eighths of an inch, and the ruler 41 teaches sixteenths of an inch. The ruler 42 teaches the additions of fractions, and ruler 43 teaches the subtraction of fractions. The ruler 44 teaches the solution of problems involving fractions. The ruler 45 teaches the use of fractions in percentage figure. The ruler 46 teaches the changing of fractions to decimals. When the device is not in use the peg 35 may be removed and stored in the hole 55 which is formed on the right side of the slide 17.

FIGS. 6 and 7 show the use of braille indicia or markings on the rulers and the slide. The slide of FIG. 7 has been indicated by the numeral 17b, and it shows braille indicia under the holes on the slide. The ruler 56, shown in FIG. 6, is provided with problems in braille for the solution of fractions in a manner similar to the problems on ruler 44. It will be seen that this device may be used to teach the use of the ruler, fractional arithmetic, and other like subject matter to blind persons by employing braille indicia on the rulers instead of the usual letters and other markings. It will be understood that the term indicia marking is used to mean not only numbers, fractions, and braille markings but is also used to indicate fractional parts of an inch, or any other markings which may be used on the rulers.

FIGS. 8 and 9 illustrate rulers and a slide, respectively, which may be employed in the invention to teach the multiplication tables. The rulers and other structure of FIG. 8 have been marked with the same reference numerals as used in the embodiment of FIG. 4, followed by the small letter "c." The slide has been indicated by the reference numeral 17c. The rulers or elongated members 38c through 48c contain the multiplication tables from the 2's through the 12's. The indicia on the rulers show the unknown factor to be solved for as "N." The unknown "N" will be a number from 1 to 12, and, accordingly, the slide 17c is provided with twelve holes, 57 through 68, and these holes are equivalent to the holes 20 through 34 in the slide 17. The bottom board 10 employed with the slide 17c would have twelve mating holes, 57c through 68c, which are adapted to be aligned with the slide holes 57 through 68, in the same manner as employed in the embodiment of FIG. 1. For example, if the student wants to solve for "N" in the problem "2×N=24," he would move the slide 17c until the indicator 36c is aligned with this problem on ruler 38c and insert the peg 35 into the hole 67, which would be aligned with a hole 67c in the bottom board 10.

Experience has shown that the device of the present invention provides a learning process by association which is readily retained by a student so that he becomes proficient in reading the ruler, readily learns the multiplication tables, and understands fractional problems. This educational aid is adapted to create interest which stimulates a child to learn the use of a ruler, fractional problems, multiplication problems, and other like problems.

The term "problems" in the claims means the fractional arithmetic problems on the rulers 42—46, and 56, the fractional symbols on ruler 38, the ruler graduations on rulers 39, 40 and 41, and, the multiplication problems on the rulers of FIG. 8.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. An educational aid, comprising a base plate provided with a plurality of holes therethrough located at predetermined positions; a slide movably mounted on said base plate and provided with a plurality of predetermined positioned holes; an indicia marking on said slide beside each of the holes; indicia representative of a plurality of problems carried by said base plate at spaced apart positions thereon; an indicator handle on said slide; a peg for selective insertion into the holes in said slide; and, said holes being positioned in said slide and base plate so that when the slide is positioned with the indicator handle in alignment with one of the problems a predetermined hole in said slide will be aligned with one of the holes in said base plate, and said peg will be received in the aligned holes.

2. An educational aid, comprising: a base plate provided with a plurality of holes therethrough located at predetermined positions; a slide movably mounted on said base plate and provided with a plurality of predetermined positioned holes; an indicia marking on said slide beside each of the holes; an elongated member mounted on said base plate along one side thereof; indicia representative of a plurality of problems on said elongated member at spaced apart positions thereon; an indicator handle on said slide; a peg for selective insertion into the holes in said slide; and, said holes being positioned in said slide and base plate so that when the slide is positioned with the indicator handle in alignment with one of the problems on said elongated member a predetermined hole in said slide will be aligned with one of the holes in said base plate, and said peg will be received in the aligned holes.

3. An educational aid as defined in claim 2, wherein: said aid includes a plurality of elongated members swingably mounted on said base plate for selective use of the same.

References Cited in the file of this patent

UNITED STATES PATENTS

| | | |
|---|---|---|
| D. 173,363 | Louis | Nov. 2, 1954 |
| 2,464,146 | Mohler | Mar. 8, 1949 |
| 2,645,041 | Merrill | July 14, 1953 |
| 2,681,804 | Stover | June 22, 1954 |
| 2,943,400 | Griswold | July 5, 1960 |